United States Patent
Ha et al.

(10) Patent No.: US 12,494,655 B2
(45) Date of Patent: Dec. 9, 2025

(54) BATTERY SYSTEM AND OPERATING METHOD OF ELECTRONIC DEVICE INCLUDING THE SAME

(71) Applicant: Samsung Electronics Co., Ltd., Suwon-si (KR)

(72) Inventors: Jungik Ha, Seoul (KR); Sangwon Lee, Seoul (KR)

(73) Assignees: Samsung Electronics Co., Ltd., Suwon-si (KR); SEOUL NATIONAL UNIVERSITY R&DB FOUNDATION, Suwon-si (KR)

( * ) Notice: Subject to any disclaimer, the term of this patent is extended or adjusted under 35 U.S.C. 154(b) by 944 days.

(21) Appl. No.: 17/692,409

(22) Filed: Mar. 11, 2022

(65) Prior Publication Data
US 2022/0294236 A1 Sep. 15, 2022

(30) Foreign Application Priority Data

Mar. 11, 2021 (KR) .................. 10-2021-0032096
Aug. 9, 2021 (KR) .................. 10-2021-0104808

(51) Int. Cl.
*H02J 7/00* (2006.01)
*H01M 10/42* (2006.01)
(Continued)

(52) U.S. Cl.
CPC .......... *H02J 7/0019* (2013.01); *H01M 10/425* (2013.01); *H02J 7/0048* (2020.01);
(Continued)

(58) Field of Classification Search
CPC .... H02J 7/0019; H02J 7/0048; H02J 7/00714; H02J 7/0063; H01M 10/425; H01M 10/4257
(Continued)

(56) References Cited

U.S. PATENT DOCUMENTS 6,268,710 B1 * 7/2001 Koga .................. G01R 31/396
320/162
9,048,669 B2 6/2015 Lim et al.
(Continued)

FOREIGN PATENT DOCUMENTS

KR 102120797 B1 6/2020

OTHER PUBLICATIONS

Cao, J. et al. "Battery Balancing Methods: A Comprehensive Review." IEEE Vehicle Power and Propulsion Conference (VPPC), 2008.
(Continued)

*Primary Examiner* — Alexis B Pacheco
(74) *Attorney, Agent, or Firm* — Fish & Richardson P.C.

(57) ABSTRACT

A battery system configured to provide power to a load based on a load current includes a first battery cell selectively connected to a first output terminal and a second output terminal and having a first state of charge, a second battery cell selectively connected to the first output terminal and the second output terminal and having a second state of charge indicating a lower charge level than the first state of charge, a direct current (DC)-direct current (DC) converter including an input capacitor connected to the first and second output terminals, and a switching circuit configured to perform a first cell balancing operation or a second cell balancing operation based on a magnitude of the load current, the first cell balancing operation including alternately connecting the input capacitor to the first battery cell or the second battery cell, and the second cell balancing operation including connecting the input capacitor to the first battery cell, based on a magnitude of the load current.

17 Claims, 17 Drawing Sheets

(51) Int. Cl.
*H02J 7/14* (2006.01)
*H02J 7/34* (2006.01)

(52) U.S. Cl.
CPC ........ *H02J 7/0063* (2013.01); *H02J 7/00714* (2020.01); *H02J 7/345* (2013.01); *H01M 2010/4271* (2013.01); *H02J 2207/20* (2020.01)

(58) Field of Classification Search
USPC .......................................................... 320/134
See application file for complete search history.

(56) References Cited

U.S. PATENT DOCUMENTS

| | | | |
|---|---|---|---|
| 10,063,070 B2 | 8/2018 | Hsiao et al. | |
| 10,811,886 B2 | 10/2020 | Kim | |
| 11,128,153 B1* | 9/2021 | Cho .................. | H02J 7/007184 |
| 2001/0038275 A1* | 11/2001 | Hanada .................. | H02J 7/345 |
| | | | 320/118 |
| 2002/0190692 A1* | 12/2002 | Marten ................. | H02J 7/0018 |
| | | | 320/116 |
| 2007/0025135 A1* | 2/2007 | Yamamoto ............. | H02J 7/345 |
| | | | 365/132 |
| 2009/0079391 A1* | 3/2009 | Lupu ..................... | H02J 7/0016 |
| | | | 320/122 |
| 2009/0286149 A1 | 11/2009 | Ci et al. | |
| 2010/0134068 A1* | 6/2010 | Lim ..................... | H02J 7/0016 |
| | | | 320/116 |
| 2010/0201323 A1* | 8/2010 | Okamura .............. | H02J 7/0031 |
| | | | 320/134 |
| 2011/0248677 A1* | 10/2011 | Shimizu ................ | H02J 7/0016 |
| | | | 320/118 |
| 2011/0285539 A1* | 11/2011 | Lee .................... | H01M 10/4207 |
| | | | 324/537 |
| 2013/0015821 A1* | 1/2013 | Kim ...................... | H02J 7/0019 |
| | | | 320/128 |
| 2013/0076310 A1 | 3/2013 | Garnier et al. | |
| 2014/0070757 A1* | 3/2014 | Hong ................... | H02J 7/0018 |
| | | | 320/103 |
| 2016/0043578 A1* | 2/2016 | Miyamoto .......... | H01M 10/482 |
| | | | 320/118 |
| 2017/0244257 A1* | 8/2017 | Sung ......................... | H02J 7/00 |
| 2018/0269542 A1* | 9/2018 | Muenzel ................ | B60L 58/24 |
| 2018/0337536 A1* | 11/2018 | Li ............................. | H02J 7/00 |
| 2019/0039476 A1* | 2/2019 | Nakao .................. | G01R 31/396 |
| 2021/0376618 A1* | 12/2021 | Chen .................... | H01M 10/441 |
| 2022/0149836 A1* | 5/2022 | An ....................... | H03K 17/145 |

OTHER PUBLICATIONS

Ci, S. et al. "A Novel Design of Adaptive Reconfigurable Multicell Battery for Power-Aware Embedded Networked Sensing Systems." IEEE Global Telecommunications Conference, 2007.

Kim, T. et al. "Series-connected self-reconfigurable multicell battery." Twenty-Sixth Annual IEEE Applied Power Electronics Conference and Exposition (APEC), 2011.

* cited by examiner

FIG. 6

| Mode | Cell balancing operation 1 | | Cell balancing operation 2 | | |
|---|---|---|---|---|---|
| | Mode 1 | Mode 2 | Mode 3 | Mode 4 | Mode 5 |
| I_L | I_L ≤ I_th1 | | I_L > I_th1 | I_th1 < I_L ≤ I_th2 | I_th2 < I_L |
| I_CH | I_CH=0 | I_CH=I_CH1 | I_CH=0 | I_CH=I_CH2 | I_CH=I_CH3 |

BATTERY SYSTEM AND OPERATING METHOD OF ELECTRONIC DEVICE INCLUDING THE SAME

CROSS-REFERENCE TO RELATED APPLICATIONS

This application is based on and claims priority under 35 U.S.C. § 119 to Korean Patent Application Nos. 10-2021-0032096, filed on Mar. 11, 2021, and 10-2021-0104808, filed on Aug. 9, 2021, in the Korean Intellectual Property Office, the disclosures of which are incorporated by reference herein in their entirety.

BACKGROUND

The inventive concepts relate to a battery system, and more particularly, to a battery system performing a cell balancing operation and an operating method of an electronic device including the battery system.

Portable electronic devices, such as mobile phones, include batteries. As next-generation communication technology continues to evolve, power required, or sufficient, for data processing in mobile phones is increasing. Accordingly, one battery pack includes a plurality of battery cells.

However, because the plurality of battery cells may not have perfectly the same characteristics, as charging and discharging of the battery pack are repeated, an imbalance may occur in the state of charge between the battery cells. When charging and discharging of the battery pack are continuously repeated without suppressing the imbalance, the usable capacity of the battery pack is reduced and deterioration of battery cells included therein is accelerated.

SUMMARY

The inventive concepts provide a battery system capable of supplying power to a system load while performing a cell balancing operation between battery cells by including a switching circuit, and an operating method of an electronic device including the battery system.

The inventive concepts provide a battery system that extends the lifespan of a plurality of battery cells by performing a cell balancing operation in different modes according to a load current, and an operating method of an electronic device including the battery system.

According to some example embodiments of the inventive concepts, there is provided a battery system configured to provide power to a load based on a load current, the battery system including a first battery cell selectively connected to a first output terminal and a second output terminal and having a first state of charge, a second battery cell selectively connected to the first output terminal and the second output terminal and having a second state of charge indicating a lower charge level than the first state of charge, a direct current (DC)-direct current (DC) converter including an input capacitor connected to the first and second output terminals, and a switching circuit configured to perform a first cell balancing operation or a second cell balancing operation based on a magnitude of the load current, wherein the first cell balancing operation includes alternately connecting the input capacitor to the first battery cell or the second battery cell, and the second cell balancing operation includes connecting the input capacitor to the first battery cell, based on a magnitude of the load current.

According to some example embodiments of the inventive concepts, there is provided a battery system including first to third battery cells selectively connected to a first output terminal and a second output terminal, a charger integrated circuit (IC) configured to generate a charge current for charging the first to third battery cells, based on an external power source, a switching circuit configured to connect the first to third battery cells in series with each other according to presence or absence of the charging current, and perform a cell balancing operation for the first to third battery cells by connecting at least one of the first to third battery cells to the first and second output terminals, and a direct current (DC)-direct current (DC) converter including an input capacitor connected to the first and second output terminals, the DC-DC converter configured to provide a load current as a power source of a load, wherein the charger IC is configured to generate the charge current having a magnitude determined based on at least one of the load current or a difference between states of charge of the first to third battery cells.

According to some example embodiments of the inventive concepts, there is provided an operating method of an electronic device, the operating method including simultaneously charging a plurality of battery cells by connecting the plurality of battery cells in series, based on presence or absence of a charge current provided to the plurality of battery cells, and performing a first cell balancing operation or a second cell balancing operation, based on a magnitude of a load current transferred from the plurality of battery cells to a system load, wherein, the first cell balancing operation, includes performing cell balancing between a first battery cell from among the plurality of battery cells and a second battery cell from among the plurality of battery cells by transferring a voltage of the first battery cell having a relatively high state of charge from among the plurality of battery cells to the second battery cell having a relatively low state of charge, and the second cell balancing operation includes performing cell balancing between the first battery cell and the second battery cell by providing power to the system load by using the first battery cell.

BRIEF DESCRIPTION OF THE DRAWINGS

Example embodiments of the inventive concepts will be more clearly understood from the following detailed description taken in conjunction with the accompanying drawings in which:

FIG. 6 is a diagram illustrating an operation mode of a cell balancing operation according to an example embodiment;

DETAILED DESCRIPTION

Hereinafter, various example embodiments of the inventive concepts will be described with reference to the accompanying drawings.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 1:
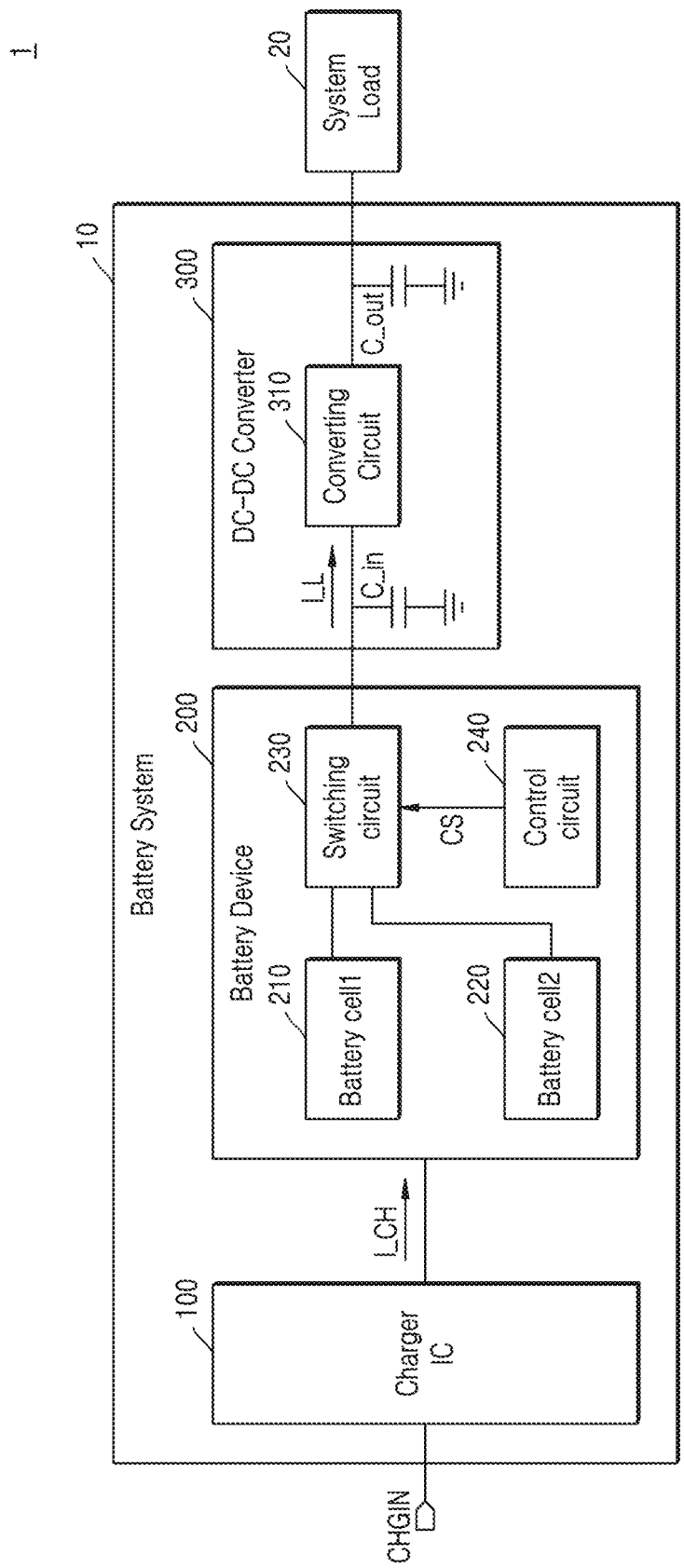
FIG. 1 is a diagram illustrating an electronic device according to an example embodiment.

FIG. 1 is a diagram illustrating an electronic device 1 according to an example embodiment.

Referring to FIG. 1, the electronic device 1 may include a battery system 10 and a system load 20. The battery system 10 may receive a charge input CHGIN and provide power to the system load 20. The electronic device 1 may be a mobile device such as a smartphone, a tablet personal computer (PC), a mobile phone, a personal digital assistant (PDA), a laptop, a wearable device, a global positional system (GPS) device, an e-book terminal, a digital broadcasting terminal, an MP3 player, and/or a digital camera. Furthermore, the electronic device 1 may be a device for performing the Internet of Things (IoT) and/or a device included in an electric vehicle.

The battery system 10 may include a charger integrated circuit (IC) 100, a battery device 200, and/or a direct current (DC)-direct current (DC) converter 300.

The charger IC 100 may be referred to as a battery charger. The charger IC 100 may be implemented as an integrated circuit chip, and may be mounted on a printed circuit board. The charger IC 100 may receive the charge input CHGIN and output a charge current I_CH for charging the battery device 200. For example, the charge input CHGIN may be a charge current having a constant value in a constant current (CC) period for charging the battery device 200, and/or may be a charge voltage having a constant value in a constant voltage (CV) period.

In some example embodiments, the charger IC 100 may be connected to a travel adapter (TA) (not shown) to receive the charge input CHGIN from the TA (not shown). The TA (not shown) may convert AC 110 volts (V) to 220V power, which is household power, or power supplied from another power supply unit (e.g., a computer) into DC power required, or sufficient, for battery charging and provide the DC power to the electronic device 1. In an example embodiment, the charger IC 100 may be connected to an auxiliary battery (not shown) and charge the battery device 200 by using DC power received from the auxiliary battery (not shown). In addition, the charger IC 100 may be connected to a wireless charging circuit (not shown) and/or configured to include the wireless charging circuit (not shown) to receive a charge input CHGIN from the wireless charging circuit (not shown).

In some example embodiments, the charger IC 100 may be a switching charger and/or a linear charger. In some example embodiments, the charger IC 100 may further include a circuit and/or block supporting at least one of various functions, such as an under-voltage lockout (UVLO) function, an over-current protection (OCP) function, an over-voltage protection (OVP) function, a soft-start function of reducing inrush current, a foldback current limit function, a hiccup mode function for short circuit protection, and/or an over-temperature protection (OTP) function, to operate properly even under power saving conditions.

The battery device 200 may be embedded in the electronic device 1 or may be detachable from the electronic device 1. In some example embodiments, the battery device 200 may be a multi-cell battery including a plurality of battery cells. In some example embodiments, the battery device 200 may be a single cell battery including one battery cell. The battery device 200 may be referred to as a battery pack.

The battery device 200 may include first and second battery cells 210 and 220. The first and second battery cells 210 and 220 may have different states of charge. For example, the first battery cell 210 may have a first state of charge, and the second battery cell 220 may have a second state of charge that is lower than the first state of charge. The battery device 200 may receive the charge current I_CH, and the first and/or second battery cells 210 and 220 may be charged based on the charge current I_CH.

The battery device 200 may include a switching circuit 230 and/or a control circuit 240. The switching circuit 230 may be configured such that the first and second battery cells 210 and 220 are connected in parallel to each other, or be configured such that the first and second battery cells 210 and 220 are connected in series with each other, based on a control signal CS. The control circuit 240 may generate the control signal CS based on the presence or absence of the charge current I_CH and the magnitude of a load current I_L.

In some example embodiments, the control circuit 240 may control the switching circuit 230 to connect the first and second battery cells 210 and 220 in series with each other, based on the presence or absence of the charge current I_CH. In some example embodiments, the control circuit 240 may control the switching circuit 230 to perform a first cell balancing operation and/or a second cell balancing operation for the first and second battery cells 210 and 220 based on the magnitude of the load current I_L. The cell balancing operation may refer to an operation of uniformly adjusting the states of charge of battery cells having different states of charge.

The switching circuit 230 may perform a cell balancing operation on the first battery cell 210 and the second battery cell 220. Specifically, when the magnitude of the load current I_L is equal to or less than a first threshold level I_th1, the switching circuit 230 may perform the first cell balancing operation, and when the magnitude of the load current I_L is greater than the first threshold level I_th1, the switching circuit 230 may perform the second cell balancing operation.

During the first cell balancing operation, the switching circuit 230 may alternately connect an input capacitor C_in to the first battery cell 210 and the second battery cell 220 according to a switching frequency fsw, thereby performing a cell balancing operation. During a first period of a switching period Tsw, when the input capacitor C_in is connected to the first battery cell 210, the input capacitor C_in may be charged by the first battery cell 210. During a second period of the switching period Tsw, when the input capacitor C_in is connected to the second battery cell 220, the second battery cell 220 may be charged by the input capacitor C_in. That is, the voltage of the first battery cell 210 may be transferred to the second battery cell 220 during the switching period Tsw.

During the second cell balancing operation, the switching circuit 230 may connect the first battery cell 210 to the input capacitor C_in until the state of charge of the first battery cell 210 is the same as the state of charge of the second battery cell 220. The voltage of the input capacitor C_in may be transferred to an output capacitor C_out through a converting circuit 310, and the system load 20 may receive power from the output capacitor C_out. Accordingly, the state of charge of a battery cell connected to the input capacitor C_in may be lowered.

The switching circuit 230 may perform a cell balancing operation by transferring the voltage of the first battery cell 210 to the second battery cell 220 through the input capacitor C_in during the first cell balancing operation, and may perform a cell balancing operation by connecting the first battery cell 210 to the input capacitor C_in during the second cell balancing operation.

The DC-DC converter 300 may include the input capacitor C_in, the output capacitor C_out, and the converting circuit 310. The converting circuit 310 may generate the voltage of the output capacitor C_out by boosting or stepping down the voltage of the input capacitor C_in. The system load 20 may operate using power supplied from the output capacitor C_out.

The system load 20 may be chips and/or modules included in the electronic device 1, for example, a modem, an application processor, a memory, and/or a display. For example, the system load 20 may be an operation block, a function block, and/or an intellectual property (IP) block included in the electronic device 1, for example, a multimedia block in an application processor, and/or a memory controller. The system load 20 may also be referred to as a consuming block or load.

Because the electronic device 1 according to an example embodiment may perform a cell balancing operation by using the input capacitor C_in of the DC-DC converter 300, the electronic device 1 may not include a separate capacitor for the cell balancing operation, and the degree of integration of the electronic device 1 may be improved.

As the switching circuit 230 according to an example embodiment is configured such that the first and second battery cells 210 and 220 are connected in series with each other according to the presence or absence of the charge current I_CH, the first and second battery cells 210 and 220 may be charged at the same time.

The switching circuit 230 according to an example embodiment may provide power to the system load 20 and simultaneously perform a cell balancing operation on the first and second battery cells 210 and 220 by performing a first cell balancing operation or a second cell balancing operation according to the magnitude of the load current I_L.

Figure 2:
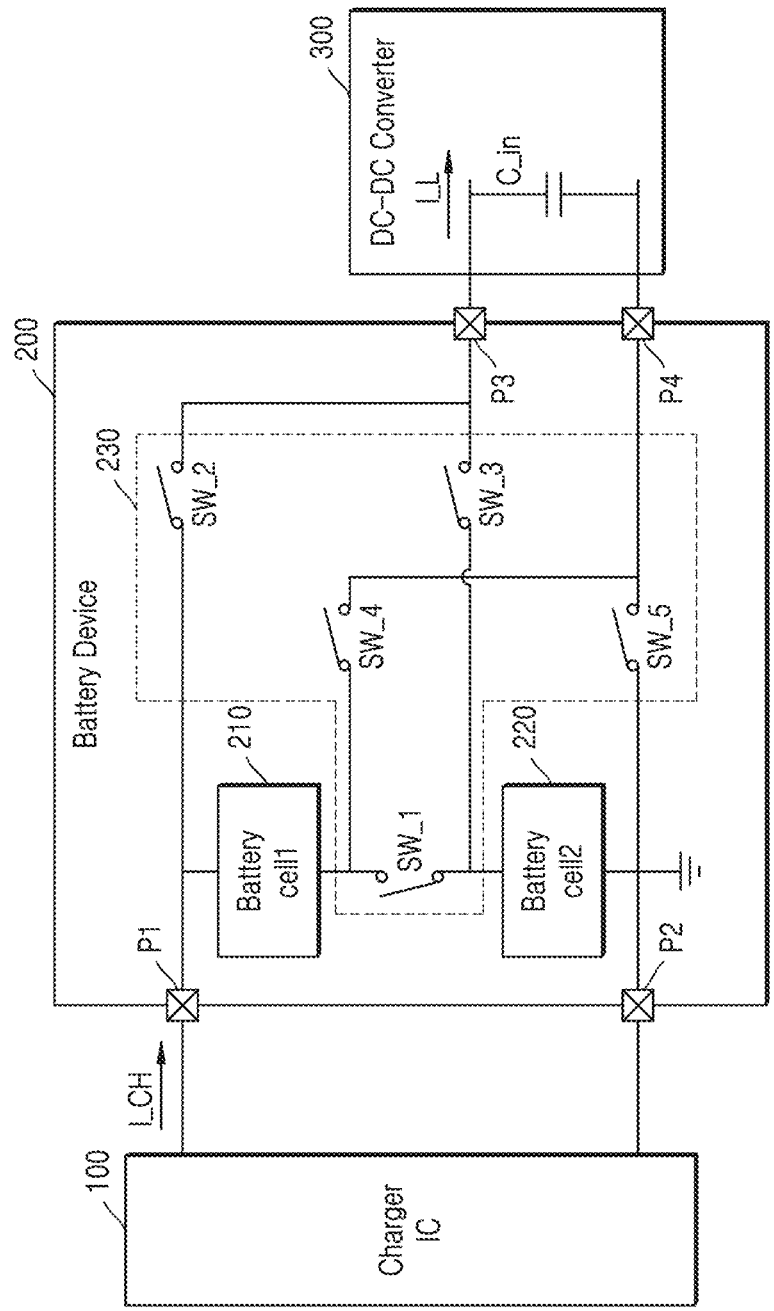
FIG. 2 is a diagram illustrating a battery device according to an example embodiment.
Figure 3:
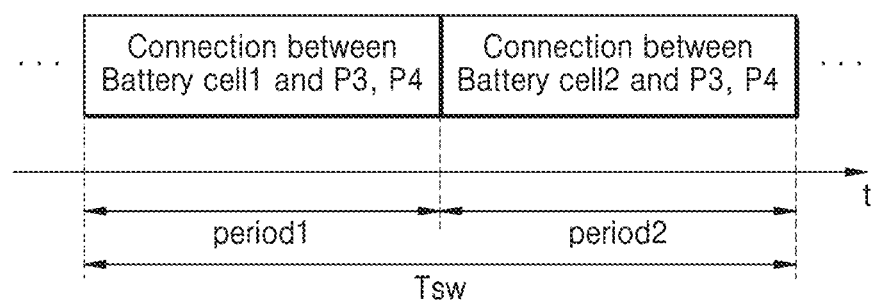
FIG. 3 is a diagram illustrating a first cell balancing operation according to an example embodiment.

FIG. 2 is a diagram illustrating a battery device 200 according to an example embodiment. FIG. 3 is a diagram illustrating a first cell balancing operation according to an example embodiment.

Referring to FIG. 2, the battery device 200 may be connected to a charger IC 100 through first and/or second input terminals P1 and P2, and may be connected to an input capacitor C_in included in a DC-DC converter 300 through first and/or second output terminals P3 and P4. The battery device 200 may receive a charge current I_CH through the first input terminal P1 and output a load current I_L through the first output terminal P3. FIG. 2 may be described with reference to FIG. 1.

A switching circuit 230 may include first to fifth switches SW_1 to SW_5. The first switch SW_1 may connect a first battery cell 210 to a second battery cell 220 in series. The second switch SW_2 may connect one end of the first battery cell 210 to the first output terminal P3. The third switch SW_3 may connect one end of the second battery cell 220 to the first output terminal P3. The fourth switch SW_4 may connect the other end of the first battery cell 210 to the second output terminal P4. The fifth switch SW_5 may connect the other end of the second battery cell 220 to the second output terminal P4.

When the charge current I_CH is present, that is, when the battery device 200 is charged, the first switch SW_1 may be turned on, and thus, the first and second battery cells 210 and 220 may be simultaneously charged.

The switching circuit 230 may perform a first cell balancing operation or a second cell balancing operation according to the magnitude of the load current I_L. Specifically, when the magnitude of the load current I_L is equal to or less than a first threshold level I_th1, the switching circuit 230 may perform the first cell balancing operation, and when the magnitude of the load current I_L is greater than the first threshold level I_th1, the switching circuit 230 may perform the second cell balancing operation.

Referring to FIGS. 2 and 3, during the first balancing operation, the first battery cell 210 and/or the second battery cell 220 may be alternately connected to the first and/or second output terminals P3 and P4 according to the switching frequency fsw. Specifically, the switching period Tsw may include a first period period1 in which the first battery cell 210 is connected to the first and/or second output terminals P3 and P4, and/or a second period period2 in which the second battery cell 220 is connected to the first and/or second output terminals P3 and P4. The lengths of the first period period1 and the second period period2 may each correspond to a half of the switching period Tsw.

During the first period period1, as the second switch SW_2 and the fourth switch SW4 are turned on and the third switch SW_3 and the fifth switch SW_5 are turned off, the first battery cell 210 may be connected to the first and second output terminals P3 and P4. During the second period period2, as the third switch SW_3 and the fifth switch SW5 are turned on and the second switch SW_2 and the fourth switch SW_4 are turned off, the second battery cell 220 may be connected to the first and second output terminals P3 and P4.

Through the first balancing operation, the state of charge of the first battery cell 210 may be the same as the state of charge of the second battery cell 220.

During the second balancing operation, the first battery cell 210 may be connected to the first and second output terminals P3 and P4, and the second battery cell 220 may not be connected to the first and second output terminals P3 and P4. Specifically, during the second cell balancing operation, the second switch SW_2 and the fourth switch SW_4 may be turned on, and the third switch SW_3 and the fifth switch SW_5 may be turned off. For convenience of description, it has been described that the first battery cell 210 is connected to the first and second output terminals P3 and P4 during the second balancing operation. However, during the second balancing operation, a battery cell having a higher state of charge from among the first and second battery cells 210 and 220 may be connected to the first and second output terminals P3 and P4.

Figure 4A:
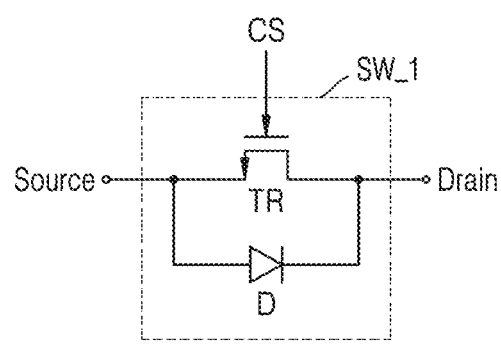
FIG. 4A is a circuit diagram illustrating a first switch in FIG. 2.
Figure 4B:
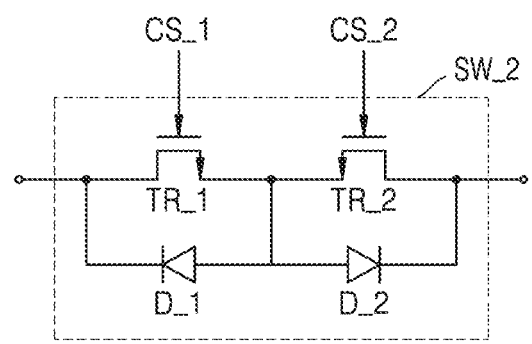
FIG. 4B is a circuit diagram illustrating a second switch in FIG. 2.

FIG. 4A is a circuit diagram illustrating the first switch SW_1 in FIG. 2, and FIG. 4B is a circuit diagram illustrating the second switch SW_2 in FIG. 2.

Referring to FIGS. 2 and 4A, the first switch SW_1 may include a transistor TR and/or a diode D. The transistor TR may be an N-channel metal oxide semiconductor (NMOS) transistor driven by a control signal CS. For example, the transistor TR may include a source connected to one end of the first battery cell 210, a gate to which the control signal CS is applied, and/or a drain connected to the other end of the second battery cell 220. However, the present disclosure is not limited thereto, and the transistor TR may be implemented as a P-channel metal oxide semiconductor (PMOS) transistor. The diode D may be a parasitic diode of the transistor TR, and the first switch SW_1 may be a unidirectional switch that transmits current only in a direction from a source to a drain.

Referring to FIG. 4B, the second switch SW_2 may include first and/or second transistors TR_1 and TR_2, and/or first and/or second diodes D_1 and D_2. The first and/or second transistors TR_1 and TR_2 may be NMOS transistors driven by first and/or second control signals CS_1 and CS_2, respectively. For example, the first transistor TR_1 may include a drain connected to the first input terminal P1, a gate to which the first control signal CS_1 is applied, and/or a source connected to a source of the second transistor TR_2. The second transistor TR_2 may include the source connected to the source of the first transistor TR_1, a gate to which the second control signal CS_2 is applied, and/or a drain connected to the first output terminal P3. However, the present disclosure is not limited thereto, and the first and/or second transistors TR_1 and TR_2 may be implemented as PMOS transistors. The second switch SW_2 may be a bidirectional switch that transfers current in both directions. The third to fifth switches SW_3 to SW_5 may be implemented in the same way as the second switch SW_2.

Therefore, according to example embodiments, the usable capacity of the battery device 200 may be increased and deterioration of battery cells 210-230 included therein may be reduced or prevented. According to example embodiments, the usable capacity of the battery device 200 may be increased without an external cell balancing circuit located outside of the battery device 200. Therefore, a size and/or cost of the battery device 200 may be reduced.

Figure 5:
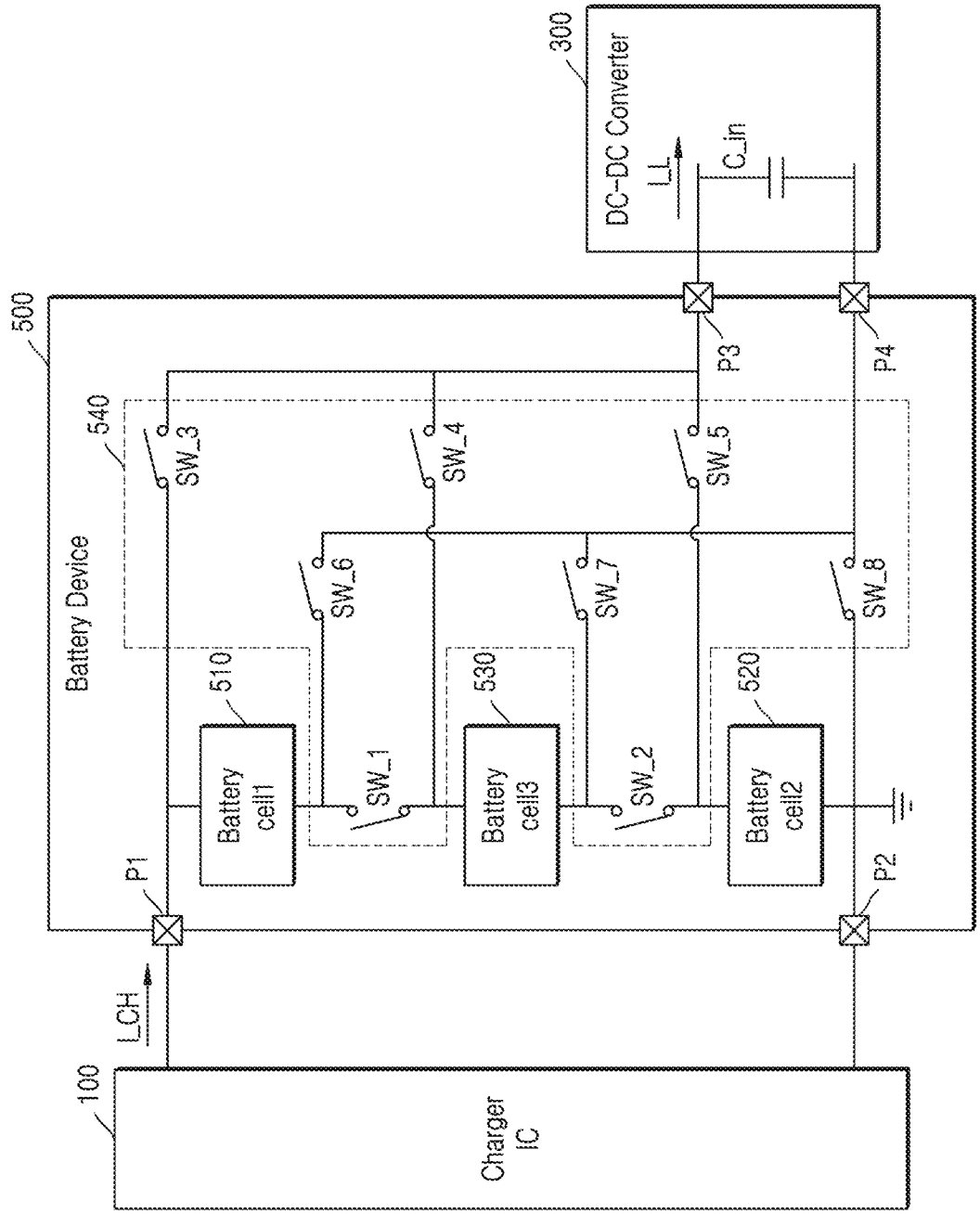
FIG. 5 is a diagram illustrating a battery device according to an example embodiment.

FIG. 5 is a diagram illustrating a battery device 500 according to an example embodiment.

Referring to FIG. 5, the battery device 500 may include first to third battery cells 510 to 530. However, the number of battery cells included in the battery device 500 is not limited thereto.

The state of charge of the first battery cell 510 may be referred to as a first state of charge, the state of charge of the second battery cell 520 may be referred to as a second state of charge, and/or the state of charge of the third battery cell 530 may be referred to as a third state of charge. When a cell balancing operation starts, the first state of charge may indicate the most charged state, and the second state of charge may indicate the least charged state.

A switching circuit 540 may include first to eighth switches SW_1 to SW_8. The first switch SW_1 may selectively connect the other end of the first battery cell 510 to one end of the third battery cell 530, and the second switch SW_2 may selectively connect the other end of the third battery cell 530 to one end of the second battery cell 520. The switching circuit 540 may be configured such that the first to third battery cells 510 to 530 are connected in series with each other by turning on the first and second switches SW_1 and SW_2 according to the presence or absence of a charge current I_CH. Accordingly, when the charge current I_CH is present, the first and second switches SW_1 and SW_2 may be turned on, and thus, the first to third battery cells 510 to 530 may be simultaneously charged.

The third switch SW_3 may selectively connect one end of the first battery cell 510 to a first output terminal P3. The fourth switch SW_4 may selectively connect one end of the third battery cell 530 to the first output terminal P3. The fifth switch SW_5 may selectively connect one end of the second battery cell 520 to the first output terminal P3. The sixth switch SW_6 may selectively connect the other end of the first battery cell 510 to a second output terminal P4. The seventh switch SW_7 may selectively connect the other end of the third battery cell 530 to the second output terminal P4. The eighth switch SW_8 may selectively connect the other end of the second battery cell 520 to the second output terminal P4.

The switching circuit 540 may perform a cell balancing operation on the first battery cell 510 having the highest initial state of charge and/or the second battery cell 520 having the lowest initial state of charge. The cell balancing operation for the first battery cell 510 and/or the second battery cell 520 may be the same as the method described above with reference to FIGS. 2 and 3.

In some example embodiments, the switching circuit 540 may perform a cell balancing operation by using two or more battery cells connected to each other in series. For example, the first battery cell 510 and the third battery cell 530 may be connected in series with each other by turning on the first switch SW_1, and a first cell balancing operation or a second cell balancing operation may be performed such that the sum of the states of charge of the first and third battery cells 510 and 530 connected in series with each other is the same as the state of charge of the second battery cell 520. Specifically, during the first cell balancing operation, as the first, third, and seventh switches SW_1, SW_3, and SW_7 are turned on during the first period period1 in FIG. 3 and the first, fifth, and eighth switches SW_1, SW_5, and SW_8 are turned on during the second period period2 in FIG. 3, the sum of the states of charge of the first and third battery cells 510 and 530 may be the same as the state of charge of the second battery cell 520. Alternatively, during the second cell balancing operation, the first, third, and seventh switches SW_1, SW_3, and SW_7 may be maintained in a turned-on state until the sum of the states of charge of the first and third battery cells 510 and 530 is the same as the state of charge of the second battery cell 520.

FIG. 6 is a diagram illustrating an operation mode of a cell balancing operation according to an example embodiment. FIG. 6 may be described with reference to FIG. 5.

Referring to FIG. 6, the switching circuit 540 may perform a first cell balancing operation and/or a second cell balancing operation. The first cell balancing operation may be performed when the load current I_L is equal to or less than a first threshold level I_th1, and the second cell balancing operation may be performed when the load current I_L is greater than the first threshold level I_th1. It may be assumed that a cell balancing operation is performed between the first battery cell 510 and the second battery cell 520. When the cell balancing operation starts, it may be assumed that the state of charge of the first battery cell 510 is greater than that of the second battery cell 520.

The first cell balancing operation may be performed in a first mode and/or a second mode. The first mode may mean a first cell balancing operation performed in a state in which the battery device 500 is not charged, that is, a state in which there is no charge current I_CH, and the second mode may mean a first cell balancing operation performed in a state in which the battery device 500 is charged, that is, a state in which there is the charge current I_CH.

In the second mode, the charger IC 100 may output the charge current I_CH having a first current level I_CH1. The first current level I_CH1 may be expressed as Equation 1.

$$I\_CH1 = I\_bal + \frac{I\_L}{2} + \left(I\_CHMAX - I\_bal - \frac{I\_L}{2}\right)(1 - SOC\_H) \quad [\text{Equation 1}]$$

Here, I_bal may denote a balancing current transferred from the first battery cell 510 to the second battery cell 520 during the switching period Tsw, I_CHMAX may denote a maximum charge current, and SOC_H may denote the highest state of charge, that is, the state of charge of the first battery cell 510. The state of charge may have a value between 0 and 1. The balancing current I_bal may be proportional to a difference between the state of charge of the first battery cell 510 and the state of charge of the second battery cell 520. For example, when the difference between the state of charge of the first battery cell 510 and the state of charge of the second battery cell 520 is relatively large, the balancing current I_bal may be relatively large. As the cell balancing operation is performed, the difference between the state of charge of the first battery cell 510 and the state of charge of the second battery cell 520 may decrease, and thus, the balancing current I_bal may gradually decrease.

According to Equation 1, when the state of charge of the first battery cell 510 is 0, the first current level I_CH1 may be the maximum charge current I_CHMAX, and when the state of charge of the first battery cell 510 is in a fully charged state, that is, 1, the first current level I_CH1 may correspond to $$I\_bal + \frac{I\_L}{2}.$$

The second cell balancing operation may be performed in a third mode to a fifth mode. The third mode may mean a second cell balancing operation performed in a state in which the battery device 500 is not charged, that is, a state in which there is no charge current I_CH, and the fourth and fifth modes may mean a second cell balancing operation performed in a state in which the battery device 500 is charged, that is, a state in which there is the charge current I_CH. When the load current I_L is greater than a first threshold level and is equal to or less than a second threshold level, the second cell balancing operation may be performed in the fourth mode, and when the load current I_L is greater than the second threshold level, the second cell balancing operation may be performed in the fifth mode.

In the fourth mode, the charger IC 100 may output the charge current I_CH having a second current level I_CH2. The second current level I_CH2 may be expressed as Equation 2.

$$I\_CH2 = \frac{1 - SOC\_M.init}{SOC\_H.init - SOC\_L.init} I\_L \quad [\text{Equation 2}]$$

Here, SOC_H.init may denote the highest initial state of charge, that is, an initial state of charge of the first battery cell 510, SOC_M.init may denote an intermediate initial state of charge, that is, an initial state of charge of the third battery cell 530, and SOC_L.init may denote the lowest initial state of charge, that is, an initial state of charge of the second battery cell 520. The state of charge may have a value between 0 and 1.

In the fifth mode, the charger IC 100 may output the charge current I_CH having a third current level I_CH3. The third current level I_CH3 may be equal to the current level of the maximum charge current I_CHMAX.

Figure 7A:
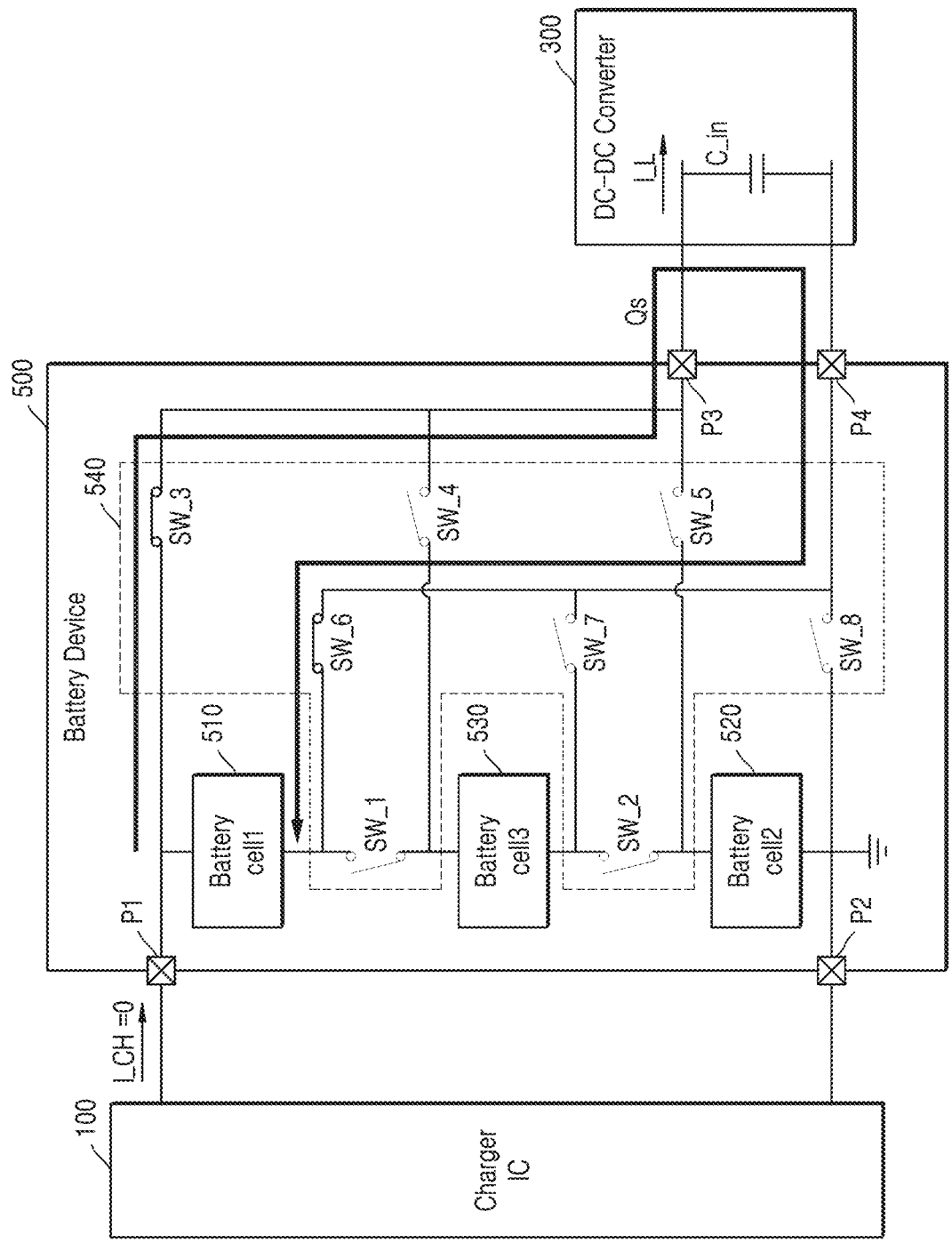
FIGS. 7A and 7B are diagrams illustrating a first cell balancing operation in a first mode.
Figure 7B:
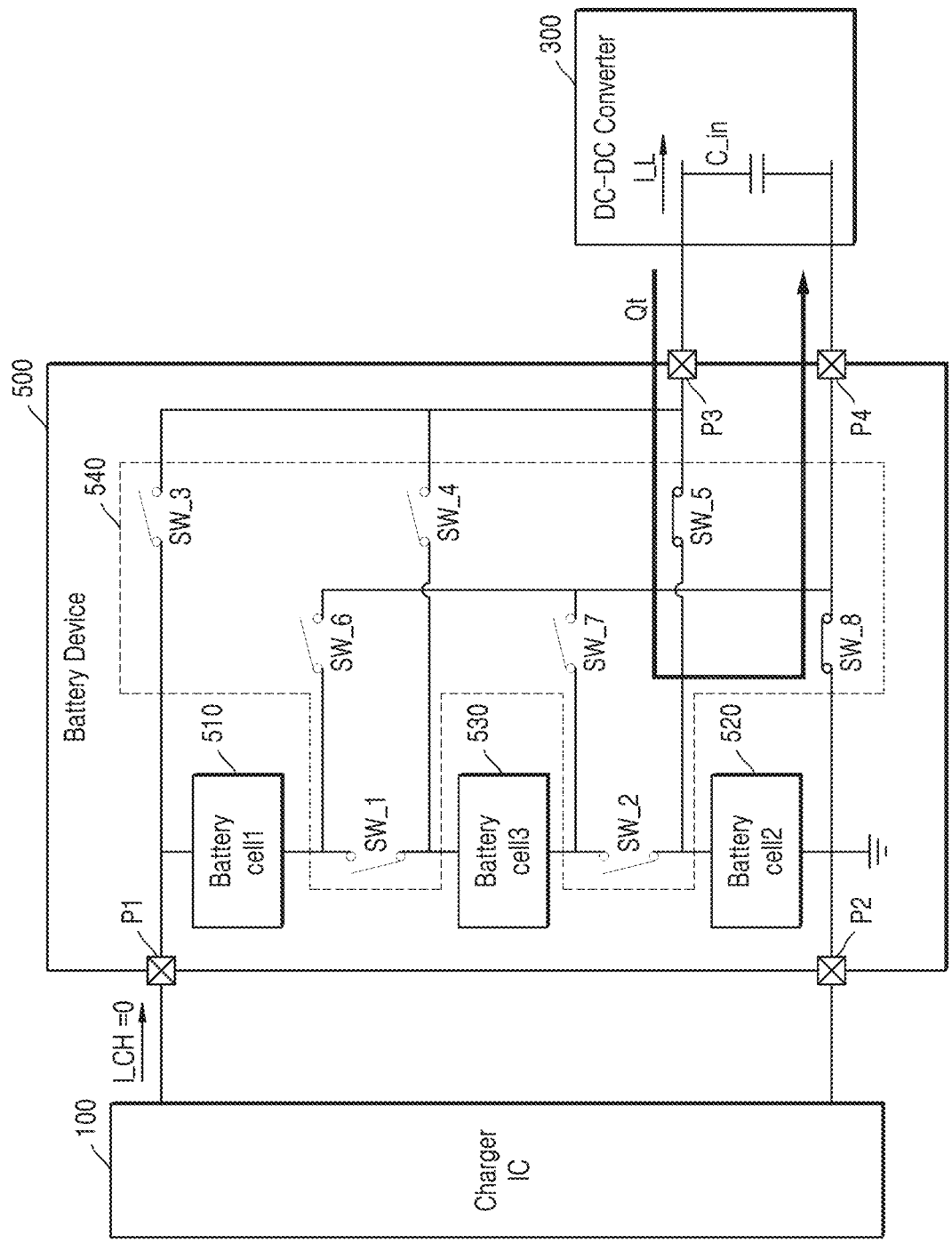

FIGS. 7A and 7B are diagrams illustrating a first cell balancing operation in a first mode. Specifically, FIG. 7A illustrates a switching circuit corresponding to the first period period1 in FIG. 3, and FIG. 7B illustrates a switching circuit corresponding to the second period period2 in FIG. 3.

Referring to FIGS. 3 and 7A, during the first period period1, the first battery cell 510 may transfer a charging charge Qs to the input capacitor C_in. The charging charge Qs may be expressed as Equation 3.

$$Qs = 2 * I\_bal * \frac{Tsw}{2} + I\_L * \frac{Tsw}{2} \quad [\text{Equation 3}]$$

Here, I_bal may denote a balancing current transferred from the first battery cell 510 to the second battery cell 520 during the switching period Tsw, and I_L may denote a load current.

Referring to FIGS. 3 and 7B, during the second period period2, the input capacitor C_in may transfer a discharging charge Qt to the second battery cell 520. The discharging charge Qt may be expressed as Equation 4.

$$Qt = 2*I\_bal*\frac{Tsw}{2} - I\_L*\frac{Tsw}{2}$$ [Equation 4]

Referring to Equation 3 and Equation 4, charges as much as I_bal*Tsw may be transferred from the first battery cell 510 to the second battery cell 520 during the switching period Tsw.

When the discharging charge Qt has a negative value, charges may not be transferred from the input capacitor C_in to the second battery cell 520 but from the second battery cell 520 to the input capacitor C_in. Accordingly, in order to perform the first cell balancing operation, the discharging charge Qt has to be equal to or greater than zero. That is, because the first cell balancing operation may be performed when I_L≤2*I_bal, the first threshold level I_th1 in FIG. 6 may correspond to 2*I_bal.

Figure 8A:
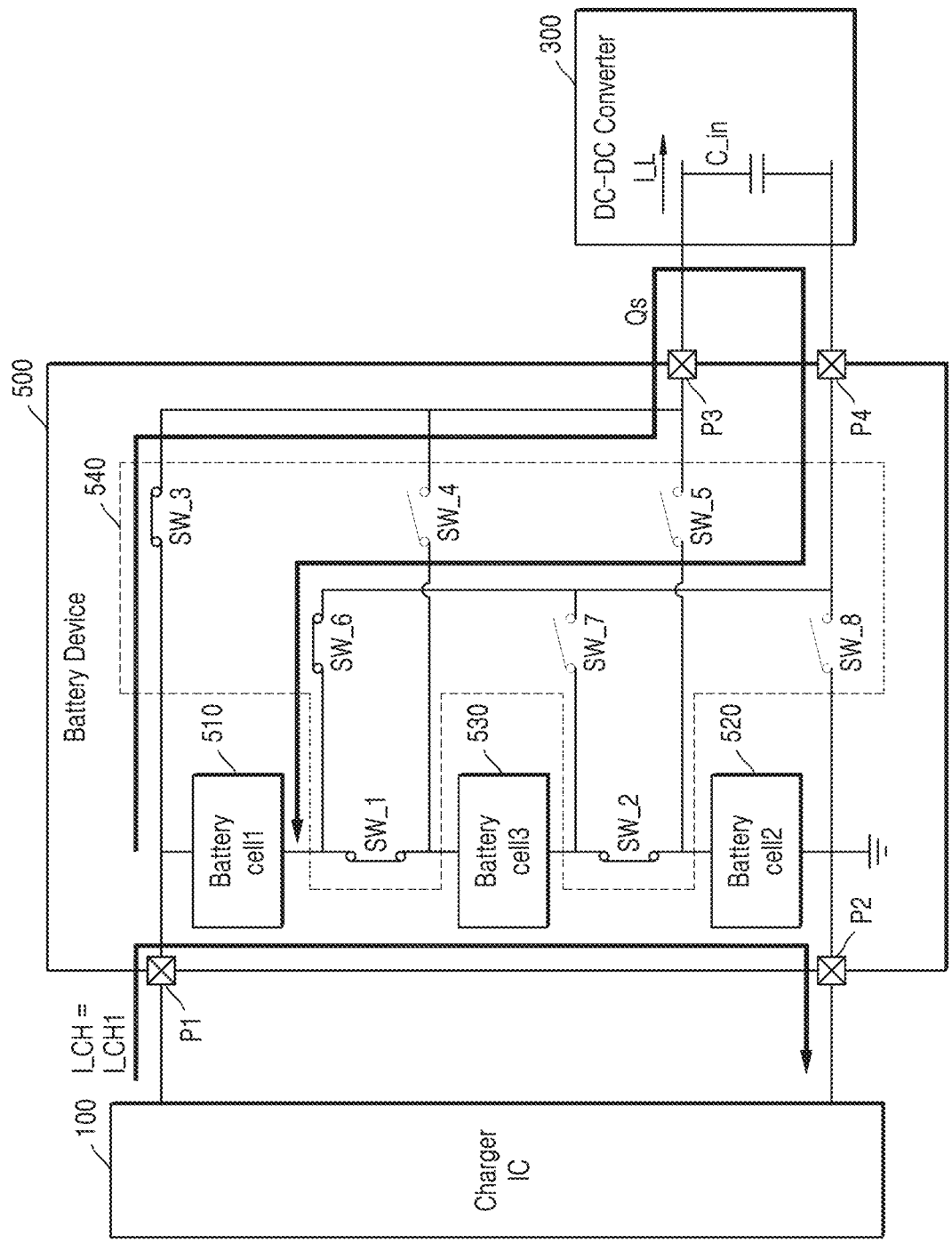
FIGS. 8A and 8B are diagrams illustrating a first cell balancing operation in a second mode.
Figure 8B:
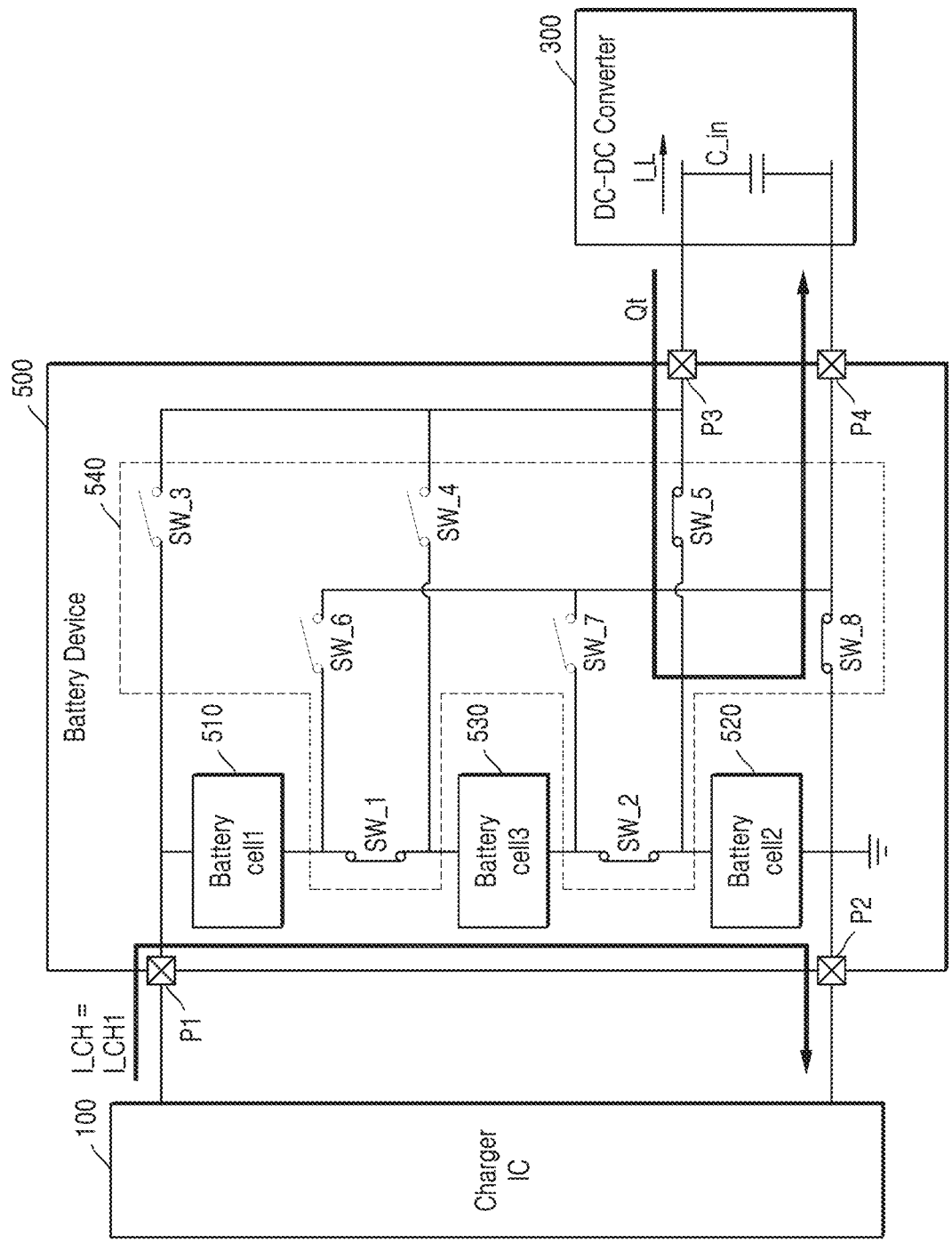

FIGS. 8A and 8B are diagrams illustrating a first cell balancing operation in a second mode. Specifically, FIG. 8A illustrates a switching circuit corresponding to the first period period1 in FIG. 3, and FIG. 8B illustrates a switching circuit corresponding to the second period period2 in FIG. 3.

Referring to FIGS. 8A and 8B, when the switching circuit 540 performs a first cell balancing operation of the second mode, the first and second switches SW_1 and SW2 may be turned on. Accordingly, the first to third battery cells 510 to 530 may be simultaneously charged by the charge current I_CH having the first current level I_CH1.

As described above with reference to Equation 1, as the first battery cell 510 is charged, the first current level I_CH1 may gradually decrease. When the first battery cell 510 is fully charged, the first current level I_CH1 may correspond to $$I\_bal + \frac{I\_L}{2}.$$

Because the charge Qs discharged from the first battery cell 510 during the first period period1 in FIG. 3 may be expressed as Equation 3, when the first current level I_CH1 is $$I\_bal + \frac{I\_L}{2}$$

as the first battery cell 510 is fully charged, charging of the first battery cell 510 may be stopped.

On the other hand, because the charge Qt charged in the second battery cell 520 during the second period period2 in FIG. 3 may be expressed as Equation 4, when the first current level I_CH1 is $$I\_bal + \frac{I\_L}{2}$$

as the first battery cell 510 is fully charged, the second battery cell 520 may be charged.

As a voltage difference between the first battery cell 510 and the second battery cell 520 decreases, the balancing current I_bal may decrease. As described above with reference to FIGS. 7A and 7B, when the balancing current I_bal decreases, the first threshold level I_th1 may decrease, and thus, the load current I_L may be greater than the first threshold level I_th1. Accordingly, the switching circuit 540 may perform a second cell balancing operation.

Figure 9:
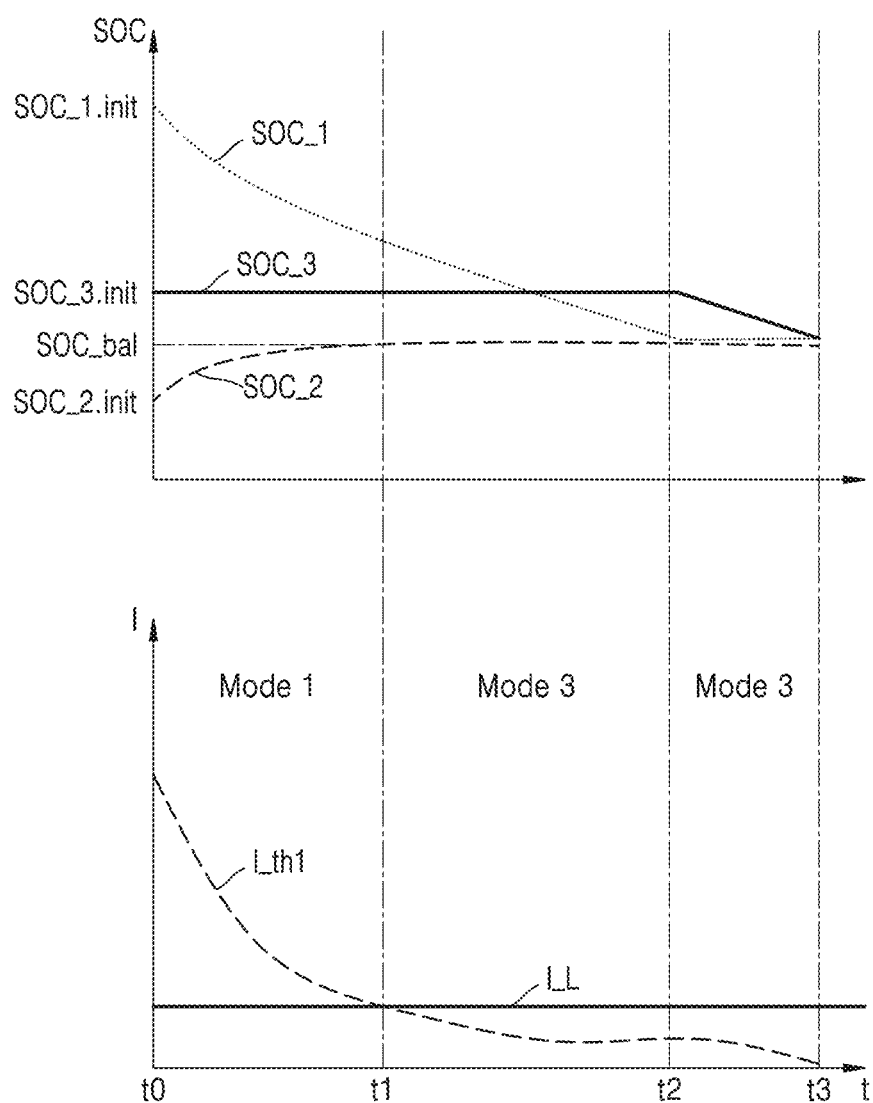
FIG. 9 is a diagram illustrating a first cell balancing operation in a first mode and a second cell balancing operation in a third mode, according to an example embodiment.

FIG. 9 is a diagram illustrating a first cell balancing operation in a first mode and a second cell balancing operation in a third mode, according to an example embodiment. That is, FIG. 9 is a diagram illustrating the first and second cell balancing operations when there is no charge current I_CH. FIG. 9 may be described with reference to FIG. 5. The first battery cell 510 may have a first state of charge SOC_1, the second battery cell 520 may have a second state of charge SOC_2, and/or the third battery cell 530 may have a third state of charge SOC_3.

At an initial time point t0, the first state of charge SOC_1 may be at a first initial level SOC_1.init, the second state of charge SOC_2 may be at a second initial level SOC_2.init, and/or the third state of charge SOC_3 may be at a third initial level SOC_3.init. Because the load current I_L is less than the first threshold level I_th1 at the initial time point t0, the first cell balancing operation in the first mode may be performed. Because the first cell balancing operation in the first mode has been described above with reference to FIGS. 7A and 7B, descriptions thereof are omitted. By the first cell balancing operation, cell balancing between the first battery cell 510 and the second battery cell 520 may be performed. As a difference between the first state of charge SOC_1 and the second state of charge SOC_2 decreases, the first threshold level I_th1 may gradually decrease.

At a first time point t1, the load current I_L may be greater than the first threshold level I_th1, and the second cell balancing operation in the third mode may be performed. During the second cell balancing operation of the third mode, a battery cell having the highest state of charge may be connected to the input capacitor C_in. Accordingly, at the first time point t1, the first battery cell 510 having the highest state of charge may be connected to the input capacitor C_in. Specifically, both ends of the first battery cell 510 may be connected to the first and second output terminals P3 and P4, respectively, and both ends of each or one or more of the second and third battery cells 520 and 530 may not be connected to the first and second output terminals P3 and P4. That is, the third and sixth switches SW_3 and SW_6 may be turned on, and the first, second, fourth, fifth, seventh, and eighth switches SW_1, SW_2, SW_4, SW_5, SW_7, and SW_8 may be turned off.

At a second time point t2, both the first state of charge SOC_1 and the second state of charge SOC_2 may have a balance level SOC_bal. At the second time point t2, the switching circuit 540 may perform a second cell balancing operation by using the third battery cell 530 having the highest state of charge. Specifically, at the second time point t2, the third battery cell 530 may be connected to the input capacitor C_in. Both ends of the third battery cell 530 may be connected to the first and second output terminals P3 and P4, respectively, and both ends of each or one or more of the first and second battery cells 510 and 520 may not be connected to the first and second output terminals P3 and P4. That is, the fourth and seventh switches SW_4 and SW_7 may be turned on, and the first, second, third, fifth, sixth, and eighth switches SW_1, SW_2, SW_3, SW_5, SW_6, and SW_8 may be turned off.

At a third time point t3, all of the first to third states of charge SOC_1 to SOC_3 of the first to third battery cells 510 to 530 may have the balance level SOC_bal.

Figure 10:
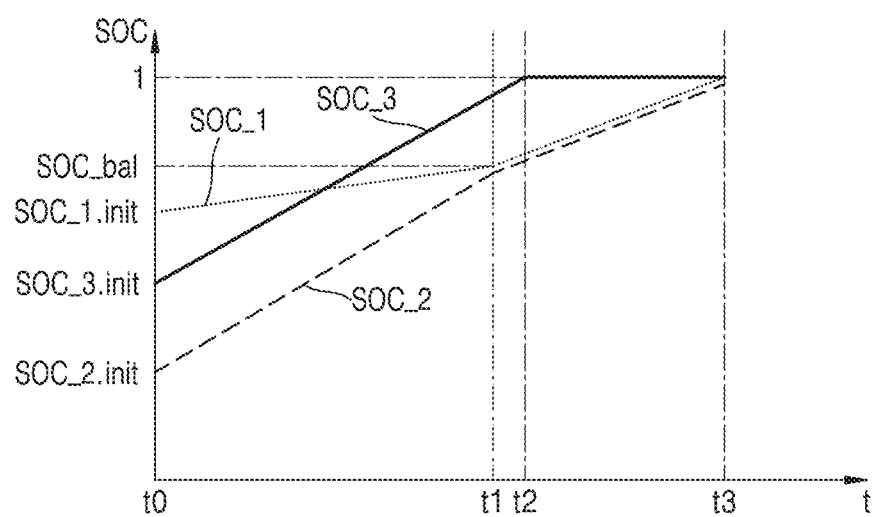
FIG. 10 is a diagram illustrating a second cell balancing operation in a fourth mode or a fifth mode according to an example embodiment.

FIG. 10 is a diagram illustrating a second cell balancing operation in a fourth mode or a fifth mode according to an example embodiment. FIG. 10 may be described with reference to FIG. 5.

Referring to FIG. 10, during the second cell balancing operation in the fourth and/or fifth modes, because the charge current I_CH is present, all of the first to third states of charge SOC_1 to SOC_3 may increase. However, during the second cell balancing operation, because the first battery cell 510 having the highest state of charge is connected to the input capacitor C_in, the first state of charge SOC_1 may increase more slowly than the second and third states of charge SOC_2 and SOC_3.

When the third battery cell 530 is fully charged before the level of the first state of charge SOC_1 becomes equal to the level of the second state of charge SOC_2, the first battery cell 510 and the second battery cell 520 may be overcharged during the charging process of the first battery cell 510 and the second battery cell 520. Therefore, before the third state of charge SOC_3 indicates a fully charged state, the level of the first state of charge SOC_1 and the level of the second state of charge SOC_2 may have to be equal to each other. That is, referring to FIG. 10, the second time point t2 may have to come after the first time point t1.

A time t11 from the initial time point t0 to the first time point t1 may be expressed as Equation 5, and a time t22 from the initial time point t0 to the second time point t2 may be expressed as Equation 6.

$$t11 = \frac{SOC\_1.init - SOC\_2.init}{I\_L} \qquad [\text{Equation 5}]$$

Referring to Equation 5, the time t11 may correspond to a time in which charges corresponding to a difference between an initial level SOC_1.int of the first state of charge SOC_1 and an initial level SOC_2.int of the second battery cell 520 are consumed by the load current I_L.

$$t22 = \frac{1 - SOC\_3.init}{I\_CHMAX} \qquad [\text{Equation 6}]$$

Referring to Equation 6, the time t22 may correspond to a time in which charges required, or sufficient, until the third battery cell 530 is fully charged are charged by a maximum charge current I_CHMAX.

That is, assuming that the battery device 500 is charged with the maximum charge current I_CHMAX, in order to reduce or prevent overcharging of the third battery cell 530, the time t11 may have to be shorter than the time t22, and thus, a condition for the load current I_L may be expressed as Equation 7.

$$I_L > I\_CHMAX \frac{SOC\_1.init - SOC\_2.init}{1 - SOC\_3.init} \qquad [\text{Equation 7}]$$

That is, a second threshold level I_th2 in FIG. 6 may be $$I\_CHMAX \frac{SOC\_1.init - SOC\_2.init}{1 - SOC\_3.init},$$

and in order to charge the battery device 500 with the maximum charge current I_CHMAX, the load current I_L may have to be greater than the second threshold level I_th2.

Figure 11:
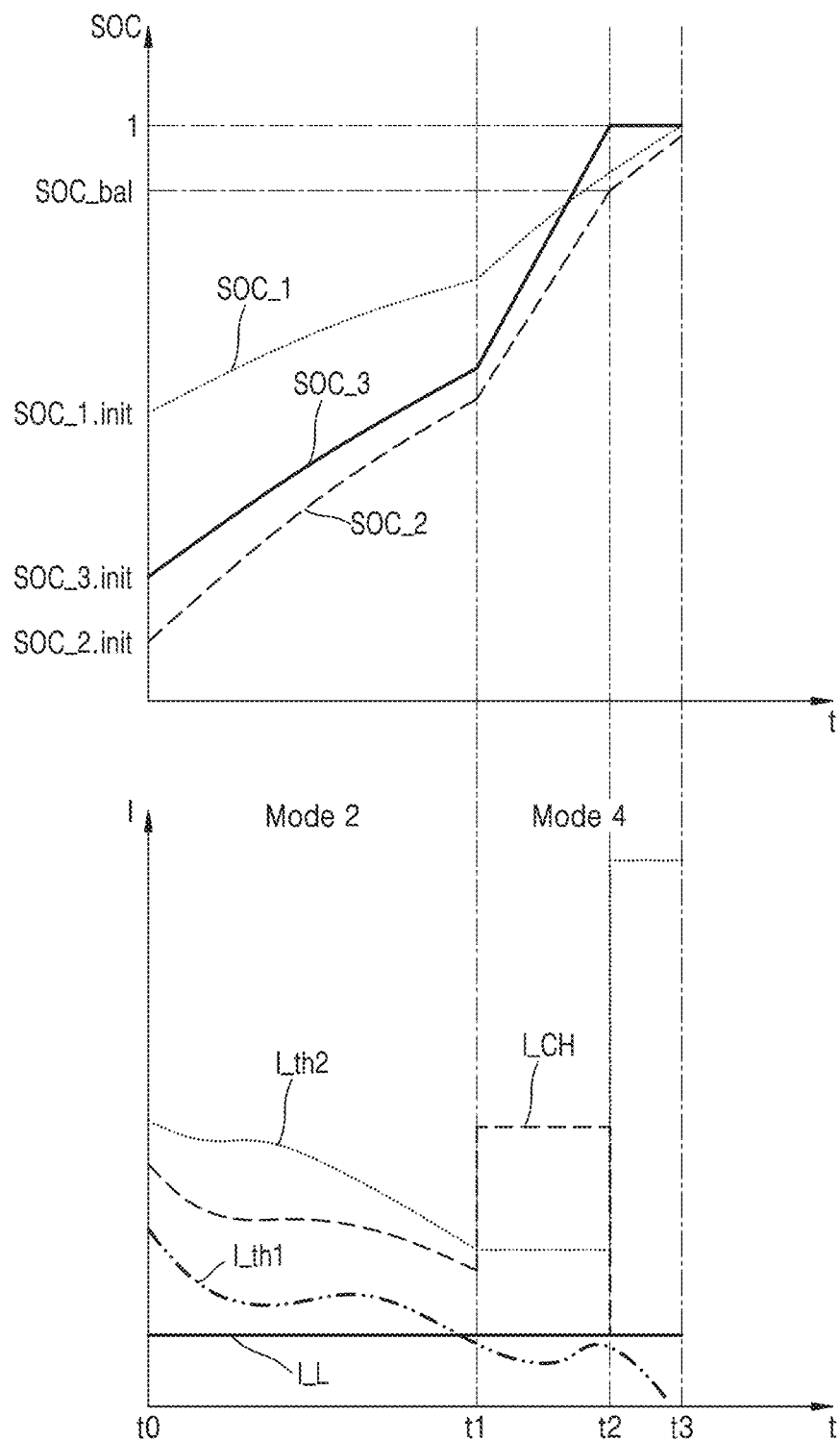
FIG. 11 is a diagram illustrating a first cell balancing operation in a second mode and a second cell balancing operation in a fourth mode, according to an example embodiment

FIG. 11 is a diagram illustrating a first cell balancing operation in a second mode and a second cell balancing operation in a fourth mode, according to an example embodiment. That is, FIG. 11 is a diagram illustrating the first and second cell balancing operations when there is a charge current I_CH. FIG. 11 may be described with reference to FIG. 5.

Because the load current I_L is less than the first threshold level I_th1 at an initial time point t0, the first cell balancing operation in the second mode may be performed. Because the first cell balancing operation in the second mode has been described above with reference to FIGS. 8A and 8B, descriptions thereof are omitted. By the first cell balancing operation, cell balancing between the first battery cell 510 and the second battery cell 520 may be performed. As a difference between the first state of charge SOC_1 and the second state of charge SOC_2 decreases, the first threshold level I_th1 may gradually decrease. While the first cell balancing operation of the second mode is performed, the charge current I_CH may have the first current level I_CH1 described above through Equation 1.

At a first time point t1, the load current I_L may be greater than the first threshold level I_th1, and the second cell balancing operation in the fourth mode may be performed. During the second cell balancing operation in the fourth mode, the first battery cell 510 having the highest state of charge may be connected to the input capacitor C_in. Specifically, both ends of the first battery cell 510 may be connected to the first and second output terminals P3 and P4, respectively, and both ends of each or one or more of the second and third battery cells 520 and 530 may not be connected to the first and second output terminals P3 and P4. That is, the third and sixth switches SW_3 and SW_6 may be turned on, and the first, second, fourth, fifth, seventh, and eighth switches SW_1, SW_2, SW_4, SW_5, SW_7, and SW_8 may be turned off. The charge current I_CH at a first time point t1 may be determined as the second current level I_CH2 calculated through Equation 2, based on first to third states of charge SOC_1 to SOC_3 at the first time point t1.

At a second time point t2, both the first state of charge SOC_1 and the second state of charge SOC_2 may have a balance level SOC_bal. The switching circuit 540 may perform a second cell balancing operation by using the third battery cell 530 having the highest state of charge at the second time point t2. That is, at the second time point t2, the third battery cell 530 may be connected to the input capacitor C_in. Specifically, both ends of the third battery cell 530 may be connected to the first and second output terminals P3 and P4, respectively, and both ends of each or one or more of the first and second battery cells 510 and 520 may not be connected to the first and second output terminals P3 and P4. That is, the fourth and seventh switches SW_4 and SW_7 may be turned on, and the first, second, third, fifth, sixth, and eighth switches SW_1, SW_2, SW_3, SW_5, SW_6, and SW_8 may be turned off. The charge current I_CH may be determined as the second current level I_CH2 calculated through Equation 2, based on the first to third states of charge SOC_1 to SOC_3 at the second time point t2. Referring to Equation 2, because the third state of charge SOC_3 is in a fully charged state at the second time point t2, SOC_H.int may be 1, and because both the first and second states of charge SOC_1 and SOC_2 are in a balance level SOC_bal at the second time point t2, the second current level I_CH2 may be equal to the load current I_L.

At a third time point t3, all of the states of charge SOC_1 to SOC_3 of the first to third battery cells 510 to 530 may indicate a fully charged state.

Figure 12:
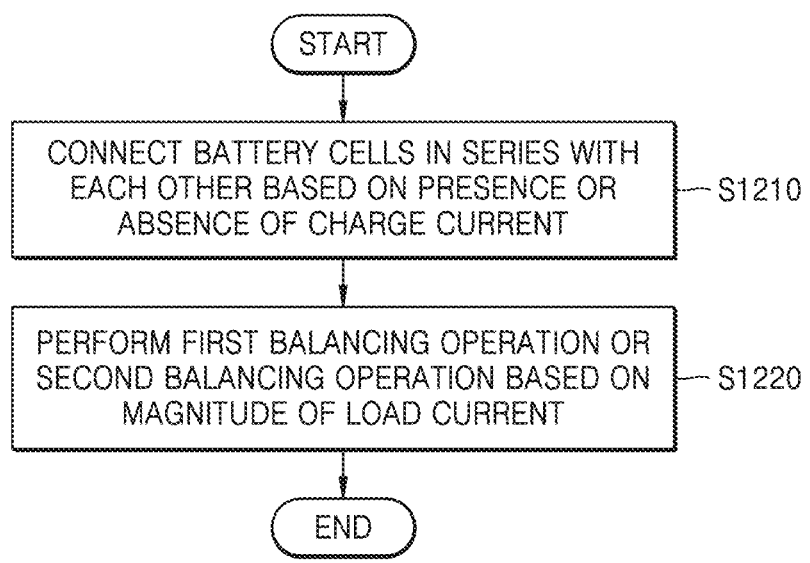
FIG. 12 is a flowchart illustrating an operating method of an electronic device according to an example embodiment.

FIG. 12 is a flowchart illustrating an operating method of an electronic device according to an example embodiment.

Referring to FIG. 12, the operating method of an electronic device may include a plurality of operations S1210 and S1220. FIG. 12 may be described with reference to FIG. 5.

In operation S1210, the switching circuit 540 may connect the first to third battery cells 510 to 530 in series with each other, based on the presence or absence of the charge current I_CH. Specifically, when there is a charge current I_CH, the switching circuit 540 may turn on the first and second switches SW_1 and SW_2, and when there is no charge current I_CH, the switching circuit 540 may turn off the first and second switches SW_1 and SW_2.

In operation S1220, the switching circuit 540 may perform a first cell balancing operation of performing cell balancing between the first battery cell 510 and the second battery cell 520 by transferring the voltage of the first battery cell 510 to the second battery cell 520, based on the magnitude of the load current I_L, or a second cell balancing operation of performing cell balancing between the first battery cell 510 and the second battery cell 520 by generating a load current by using the first battery cell 510. In detail, the switching circuit 540 may perform the first cell balancing operation when the load current I_L is equal to or less than the first threshold level I_th1, and may perform the second cell balancing operation when the load current I_L is greater than the first threshold level I_th1.

Figure 13:
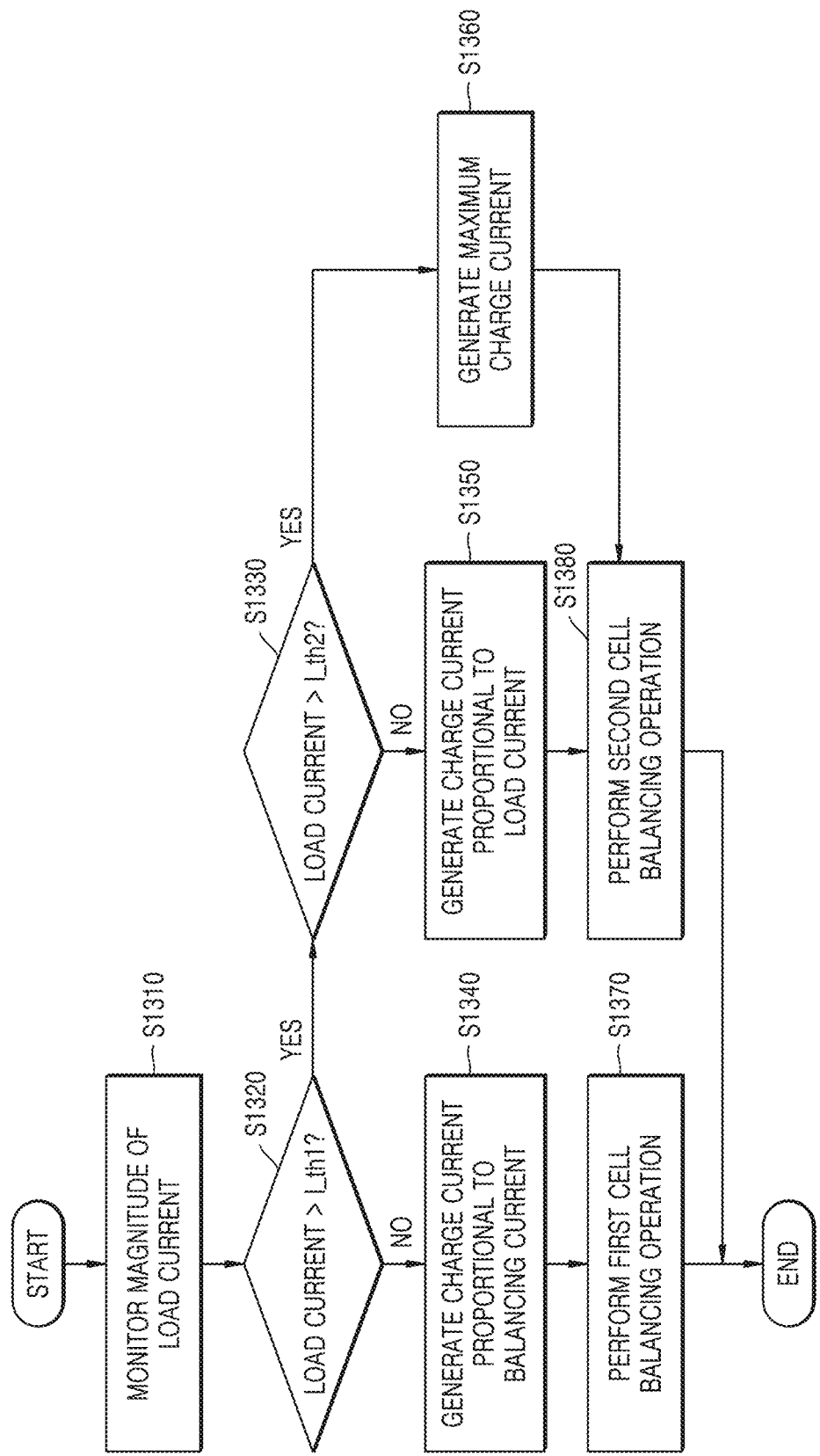
FIG. 13 is a flowchart illustrating an operating method of an electronic device according to an example embodiment.

FIG. 13 is a flowchart illustrating an operating method of an electronic device according to an example embodiment. Referring to FIG. 13, the operating method of an electronic device may include a plurality of operations S1310 to S1380. FIG. 13 may be described with reference to FIG. 1 or FIG. 5.

In operation S1310, the charger IC 100 may monitor the magnitude of the load current I_L. The charger IC 100 may determine the magnitude of the charge current I_CH based on the magnitude of the load current I_L. In the charger IC 100, the magnitude of the load current I_L may be compared with the first threshold level I_th1 and/or the second threshold level I_th2. The second threshold level I_th2 may be greater than the first threshold level I_th1.

In operation S1320, when the magnitude of the load current I_L is greater than the first threshold level I_th1, operation S1340 may be performed, and when the magnitude of the load current I_L is not greater than the first threshold level I_th1, operation S1330 may be performed. In operation S1330, when the magnitude of the load current I_L is greater than the second threshold level I_th2, operation S1350 may be performed, and when the magnitude of the load current I_L is not greater than the second threshold level I_th2, operation S1360 may be performed.

In operation S1340, the charger IC 100 may output a charge current I_CH proportional to the balancing current I_bal. Specifically, the charger IC 100 may output a charge current I_CH having the first current level I_CH1 according to Equation 1.

In operation S1370, the switching circuit 540 may perform a first cell balancing operation of transferring the voltage of the first battery cell 510 to the second battery cell 520 by using the input capacitor C_in.

In operation S1350, the charger IC 100 may output a charge current I_CH proportional to the load current I_L. In detail, the charger IC 100 may output a charge current I_CH having the second current level I_CH2 according to Equation 2.

In operation S1360, the charger IC 100 may output a maximum charge current I_CHMAX.

In operation S1380, the switching circuit 540 may perform a second cell balancing operation between battery cells by connecting a battery cell having the highest state of charge to the input capacitor C_in.

Figure 14:
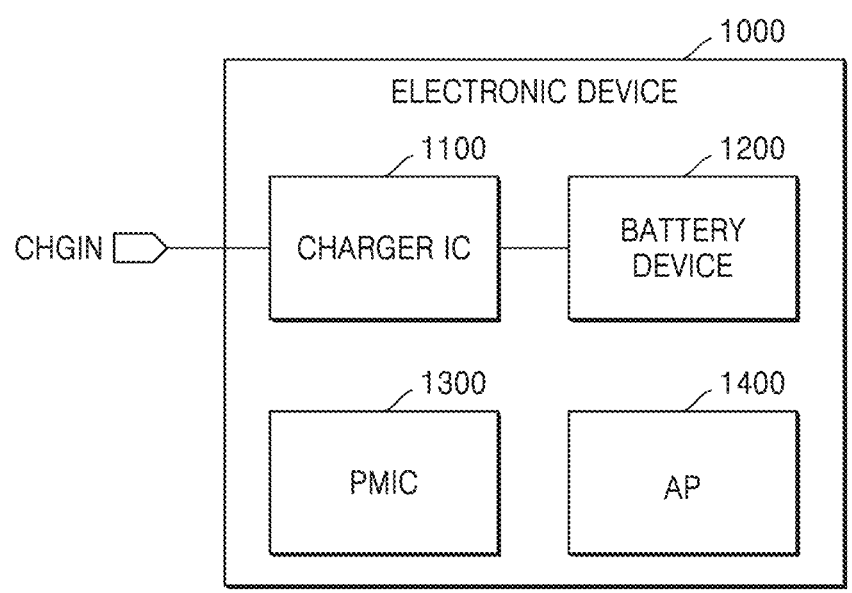
FIG. 14 is a block diagram of an electronic device according to an example embodiment.

FIG. 14 is a block diagram of an electronic device 1000 according to an example embodiment.

Referring to FIG. 14, the electronic device 1000 may include a charger IC 1100, a battery device 1200, a power management integrated circuit (PMIC) 1300, and/or an application processor 1400. The electronic device 1000 may receive power from the outside and include the charger IC 1100 for charging the battery device 1200. The charger IC 1100 and the battery device 1200 may be implemented according to various example embodiments illustrated in FIGS. 1 to 13.

The PMIC 1300 may receive a battery voltage and manage power required, or sufficient, to drive the application processor 1400. Also, the PMIC 1300 may be implemented to generate and/or manage voltages required, or sufficient, for internal components of the electronic device 1000. According to example embodiments, the electronic device 1000 may include a plurality of PMICs including the PMIC 1300. In an example embodiment, the PMIC 1300 may receive a battery voltage from the battery device 1200. In an example embodiment, the PMIC 1300 may receive a system voltage through the charger IC 1100. In an example embodiment, the PMIC 1300 may directly receive a charge input CHGIN.

The application processor 1400 may control the electronic device 1000 as a whole. In an example embodiment, the application processor 1400 may control the charger IC 1100 and/or the battery device 1200. For example, the charger IC 1100 and/or the battery device 1200 may be controlled to perform a first cell balancing operation having a first mode and a second mode, and a second cell balancing operation having third to fifth modes. In an example embodiment, when the electronic device 1000 is connected to a TA, the application processor 1400 may communicate with the TA and adjust the charge input CHGIN output from the TA. In an example embodiment, the application processor 1400 may be implemented as a system-on-chip including one or more IPs.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A battery system configured to provide power to a load based on a load current, the battery system comprising:

a first battery cell selectively connected to a first output terminal and a second output terminal and having a first state of charge;
a second battery cell selectively connected to the first output terminal and the second output terminal and having a second state of charge indicating a lower charge level than the first state of charge;
a direct current (DC)-direct current (DC) converter including an input capacitor connected to the first and second output terminals; and
a switching circuit configured to perform a first cell balancing operation or a second cell balancing operation based on a magnitude of the load current,
wherein the first cell balancing operation includes alternately connecting the input capacitor to the first battery cell or the second battery cell,
wherein the second cell balancing operation includes connecting the input capacitor to the first battery cell, based on a magnitude of the load current, and
wherein the switching circuit is configured to:
perform the first cell balancing operation in response to the magnitude of the load current being equal to or less than a first threshold level; and
perform the second cell balancing operation in response to the magnitude of the load current being greater than the first threshold level.

2. The battery system of claim 1, wherein the first threshold level is based on a balancing current proportional to a difference between a state of charge of the first battery cell and a state of charge of the second battery cell.

3. The battery system of claim 2, further comprising:
a charger integrated circuit (IC) configured to charge at least one of the first battery cell or the second battery cell by outputting a charge current,
wherein the charger IC is configured to output the charge current proportional to the balancing current during the first cell balancing operation.

4. The battery system of claim 3, wherein the switching circuit is configured to connect the first battery cell to the second battery cell in series according to presence or absence of the charge current.

5. The battery system of claim 3, wherein the charger IC is configured to output the charge current having a magnitude determined based on the load current, or a given magnitude, according to a comparison result between the magnitude of the load current and a second threshold level, the second threshold level being greater than the first threshold level.

6. The battery system of claim 1, wherein the switching circuit is configured to perform the second cell balancing operation until a state of charge of the first battery cell is the same as a state of charge of the second battery cell.

7. A battery system comprising:
first to third battery cells selectively connected to a first output terminal and a second output terminal;
a charger integrated circuit (IC) configured to generate a charge current for charging the first to third battery cells, based on an external power source;
a switching circuit configured to
connect or disconnect the first to third battery cells in series with each other according to presence or absence of the charging current, and
perform a first cell balancing operation for the first to third battery cells by connecting at least one of the first to third battery cells to the first and second output terminals in response to a magnitude of a load current being equal or less than a first threshold level
and a second cell balancing operation by connecting the first battery cell to a input capacitor until a state of charge of the first battery cell is the same as a state of charge of the second battery cell in response to the magnitude of the load current being greater than the first threshold level; and
a direct current (DC)-direct current (DC) converter including the input capacitor connected to the first and second output terminals, the DC-DC converter configured to provide the load current as a power source of a load,
wherein the charger IC is configured to generate the charge current having a magnitude determined based at least one of on the load current or a difference between states of charge of the first to third battery cells, and
wherein the first cell balancing operation includes:
connecting the first battery cell to the input capacitor during a first period of a switching period, the first battery cell having a relatively high state of charge from among the first to third battery cells, and
connecting the second battery cell to the input capacitor during a second period of the switching period, the second battery cell having a relatively low state of charge from among the first to third battery cells.

8. The battery system of claim 7, wherein the charger IC is configured to generate the charge current having a magnitude proportional to the load current in response to the magnitude of the load current being greater than the first threshold level and equal to or less than a second threshold level, the second threshold level being greater than the first threshold level.

9. The battery system of claim 8, wherein the charger IC is configured to output the charge current having a given magnitude in response to the magnitude of the load current being greater than the second threshold level.

10. The battery system of claim 8, wherein the first threshold level is based on a balancing current transferred from the first battery cell to the second battery cell during the switching period.

11. The battery system of claim 10, wherein the first threshold level corresponds to twice a current level of the balancing current.

12. The battery system of claim 10, wherein the charger IC is configured to generate the charge current proportional to the balancing current in response to the magnitude of the load current being equal to or less than the first threshold level.

13. An operating method of an electronic device, the operating method comprising:
simultaneously charging a plurality of battery cells by connecting the plurality of battery cells in series, based on presence or absence of a charge current provided to the plurality of battery cells;
performing a first cell balancing operation in response to a magnitude of a load current being equal or less than a first threshold level, the load current transferred from the plurality of battery cells to a system load, and
performing a second cell balancing operation in response to the magnitude of the load current being greater than the first threshold level;
wherein the first cell balancing operation includes performing cell balancing between a first battery cell from among the plurality of battery cells and a second battery cell from among the plurality of battery cells by transferring a voltage of the first battery cell having a relatively high state of charge from among the plurality of battery cells to the second battery cell having a relatively low state of charge, and wherein the second cell balancing operation includes performing cell balancing between the first battery cell and the second battery cell by providing power to the system load by using the first battery cell.

14. The operating method of claim 13, wherein the performing the first cell balancing operation comprises:

generating a charge current proportional to a balancing current generated based on a difference between a state of charge of the first battery cell and a state of charge of the second battery cell, in response to the magnitude of the load current being equal to or less than the first threshold level.

15. The operating method of claim 14, wherein the first threshold level is twice a magnitude of the balancing current.

16. The operating method of claim 14, wherein the performing the second cell balancing operation comprises:

generating a charge current proportional to the load current, in response to the magnitude of the load current being greater than the first threshold level and less than a second threshold level.

17. The operating method of claim 16, wherein the performing the second cell balancing operation comprises:

generating a charge current having a given magnitude, in response to the magnitude of the load current being greater than the second threshold level.

* * * * *